3,313,777
LINEAR POLYESTERS AND POLYESTER-AMIDES FROM 2,2,4,4-TETRAALKYL-1,3-CYCLOBUTANE-DIOLS
Edward U. Elam, James C. Martin, and Russell Gilkey, Kingsport, Tenn., assignors to Eastman Kodak Company, Rochester, N.Y., a corporation of New Jersey
No Drawing. Filed Dec. 18, 1959, Ser. No. 860,375
37 Claims. (Cl. 260—47)

This invention relates to highly polymeric linear condensation polymers prepared by condensing either or both of cis or trans-2,2,4,4-tetraalkyl - 1,3 - cyclobutanediols with one or more bifunctional reactants. A particular embodiment of this invention relates to highly polymeric linear polyesters prepared by condensing (1) either or both of cis or trans-2,2,4,4-tetramethylcyclobutane-1,3-diol alone or with one or more other bifunctional reactants with (2) one or more bifunctional carboxy compounds such as carbonic acid, terephthalic acid, cyclohexanedicarboxylic acid, etc. The polyesters melt at from 100° C. to about 375° C. and are useful for fibers and film, including photographic support.

It is an object of this invention to provide new and useful highly polymeric linear polyesters, polyesteramides and other related highly polymeric linear condensation polymers derived from 2,2,4,4-tetraalkyl-1,3-cyclobutanediols.

It is a further object to provide such condensation polymers from which fibers can be prepared which can be employed in the manufacture of improved fabrics of excellent stability, dye receptivity, ironing characteristics and other valuable properties.

Another object of this invention is to provide new and improved condensation polymers as just mentioned which can be formed into films having improved melting points, tensile strength, resistance to heat distortion, stability, etc.

A still further object of this invention is to provide such new and improved condensation polymers suitable for the manufacture of molded products.

An additional object of this invention is to provide new and improved fibers, fabrics from such fibers, film, photographic film base, and the like.

Other objects are apparent from the description herein and the claims which follow.

According to an especially advantageous embodiment of this invention the above and other objects can be attained by providing a new and improved linear highly polymeric condensation polymer of (A) at least one bifunctional carboxylic acid and (B) at least one bifunctional compound selected from the group consisting of dihydroxy compounds and aliphatic diamines, the relative proportions of (A) and (B) constituents being such as to constitute a polymer selected from the group consisting of polyesters and polyesteramides in which at least 50 mole percent of said bifunctional compound (B) consists of at least one member selected from the group consisting of the cis and trans isomers of a 2,2,4,4-tetraalkyl-1,3-cyclobutanediol wherein each alkyl group contains from 1 to 4 carbon atoms, which polymer melts at above 100° C. and below about 375° C., has an inherent viscosity of at least about 0.4 as measured in a mixture of 40% tetrachlorethane plus 60% phenol and is capable of being formed into fibers. Products closely related to this invention are provided in a copending application by Martin and Elam, Ser. No. 4,185 filed Jan. 25, 1960, which covers linear polyurethanes from 2,2,4,4-tetraalkyl-1,3-cyclobutanediols.

A method for preparing 2,2,4,4-tetraalkyl-1,3-cyclobutanediols is disclosed in the copending application of Hasek and Elam, Ser. No. 728,083 filed Apr. 14, 1958, now U.S. Patent No. 2,936,324.

The particular products of this application according to preferred embodiments of the invention are highly polymeric linear condensation polymers selected from the group consisting of polyesters and polyesteramides, which contain in the molecular structure a substantial proportion of recurring groups having the following structural formula:

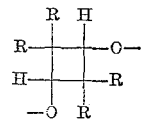

wherein R is a saturated hydrocarbon radical containing from 1 to 4 carbon atoms such as methyl, ethyl, propyl, isopropyl, butyl, secondary butyl, tertiary butyl, etc. and the cyclobutane ring is selected from the group consisting of the cis and trans isomers thereof.

The bifunctional reactants which can be employed in accordance with this invention contain no other reactive (functional) substituent which would interfere with the formation of a highly polymeric linear polymer when condensed with 2,2,4,4 - tetraalkyl-1,3-cyclobutanediols, etc., or a mixture thereof with such bifunctional reactants. These bifunctional reactants adapted for preparation of linear condensation polymers are quite well known in the prior art and are profusely illustrated by the numerous patents describing polyesters, polyesteramides, other modified polyesters, polycarbonates, block polymer modifications of these condensation polymers, etc. Many examples are given hereinbelow.

The methods available for condensing 2,2,4,4-tetraalkyl-1,3-cyclobutanediols with a bifunctional reactant to form a highly polymeric linear polyester or polyesteramide are unique only insofar as regards employment of 2,2,4,4-tetraalkyl-1,3-cyclobutanediols either as cis or trans isomers or as mixtures thereof. Methods for forming such polymers are illustrated in the same prior art previously referred to; thus, any of the methods known to the art can be used.

The terms 2,2,4,4-tetramethylcyclobutane-1,3-diol and 2,2,4,4-tetraalkyl-1,3-cyclobutanediols which appear herein without designation as to the isomer are intended to encompass either isomer or mixture thereof. The letters TMCD are an abbreviation for 2,2,4,4-tetramethylcyclobutane-1,3-diol.

The polymers prepared from 2,2,4,4-tetraalkyl-1,3-cyclobutanediols are analogous to those prepared from TMCD which is one of the homologs. They may differ from each other with regard to quantitative values but not with regard to the essential nature of their properties. The balance of the specification will primarily relate to polymers of TMCD but constitutes a disclosure as to the related polymers of 2,2,4,4-tetraalkyl-1,3-cyclobutanediols.

The TMCD employed in any of the processes for making condensation polymers can be used in combination with an additional bifunctional co-reactant such as when employing a mixture of dihydroxy compounds; advantageously the TMCD amounts to a substantial proportion, preferably at least 50 mole percent of the total of such reactants employed although smaller proportions can be used. The various bifunctional reactants which can be employed in admixture with TMCD would include other dihydroxy compounds such as bisphenols and glycols and compounds which do not necessarily react therewith, e.g., an amino-alcohol. Such coreactants also include diamines, or aminocarboxy compounds. Such coreactants, including mixtures of dihydroxy compounds are well known in the art and are illustrated by the patent art referred to above as well as in the examples hereinbelow. Hereinbelow the disclosure with reference to glycol condensation is intended to encompass other dihydroxy compounds such as bisphenols, hydroquinone, etc.

The bifunctional reactants containing functional groups which can be condensed with TMCD (or mixtures thereof with coreactants as discussed above) are bifunctional compounds capable of inter-reaction (condensation) so as to form highly polymeric linear condensation polymers. Such bifunctional compounds can be solely inter-reactive with a glycol, e.g., a dicarboxylic acid or they can be both (a) coreactive in the sense that they can be used in lieu or as a partial replacement of the glycol in a polyester, and (b) inter-reactive in the sense that they condense with a glycol or a bifunctional compound which can be employed in lieu of a glycol. Thus, 6-aminocaproic acid is both (a) coreactive in that the amino group is of the type which can be used in lieu of a hydroxy radical of a glycol, and (b) inter-reactive in the sense that the carboxylic group will react with the hydroxy of a glycol or the amine of a bifunctional compound which can be used in lieu of a glycol. The bifunctional compounds which are solely inter-reactive with a glycol include dicarboxylic acids, carbonates, etc. The other bifunctional inter-reactive compounds include aminocarboxy compounds, or hydroxycarboxy compounds.

In forming the highly polymeric linear condensation polymers of this invention those persons having ordinary skill in this art will readily perceive the various types of polymeric compositions which can be prepared employing TMCD. Several types are more specifically described hereinbelow.

The products of this invention include highly polymeric linear condensation polymers having a molecular structure comprising recurring units having the following formula:

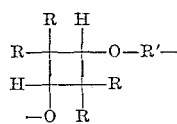

wherein the cyclobutane ring is selected from the group consisting of the cis and trans isomers thereof and R' represents an organic radical containing from 1 to 20 carbon atoms which is derived from a bifunctional carboxy compound, e.g., R' can be the dehydroxylated residue derived from a bifunctional carboxylic acid which in this more restricted sense can be designated as R'''. Neither R' or R''' are necessarily the same in each repeating unit.

The broad range of polymers just defined includes those which have melting points as low as about 100° C. and as high as about 375° C. These highly polymeric linear polyesters and polyesteramides melting below about 200° C. are primarily useful for the preparation of molding compositions. They can be advantageously extruded to form various shaped objects such as rods, tubes, sheets, etc. They can also be compression molded or otherwise formed into any desired shape.

Those polyesters and polyesteramides which melt at above about 200° C. have similar utility but are especially advantageous for the preparation of fibers and films having unusual value. Preferred polyesters are produced when a substantial proportion of the glycol is trans-TMCD and a major proportion of the bifunctional carboxy compound is a hexacarbocyclic dicarboxylic compound as defined below.

POLYESTERS

According to a more particular embodiment of this invention, highly polymeric, high melting linear polyesters can be prepared by condensing either the cis or trans isomer (or a mixture thereof) of TMCD with a hexa- carbocyclic dicarboxylic acid (including esters or acid halides thereof) so as to produce a highly polymeric, high melting linear polyester having a molecular structure principally containing recurring units having the following formula:

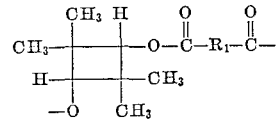

wherein the substituted cyclobutane ring is selected from the group consisting of the cis and trans isomers thereof and $R_1$ represents an organic radical containing from 6 to 20 carbon atoms which is the decarboxylated residue derived from a hexacarbocyclic dicarboxylic acid wherein the carboxy radicals are attached to a hexacarbocyclic nucleus in a para relationship.

According to another more specific embodiment of this invention there is provided a highly polymeric, linear polyester having a modified molecular structure which (1) contains a substantial proportion of recurring units having the following formula:

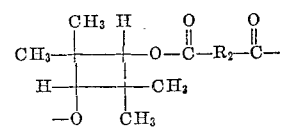

wherein the substituted cyclobutane ring is selected from the group consisting of the cis and trans isomers thereof and $R_2$ represents an organic radical containing from 6 to 20 carbon atoms which is the decarboxylated residue derived from a hexacarbocyclic dicarboxylic acid wherein the carboxy radicals are attached to a hexacarbocyclic nucleus in a para relationship, and (2) contains intermittent recurring units which are the same as the principal recurring units in a different highly polymeric, linear polyester derivable from a bifunctional dicarboxylic acid and a bifunctional glycol.

These modified linear polyesters can be produced by well-known methods by condensing the TMCD with a mixture of the defined hexacarbocyclic dicarboxylic acid (or derivative thereof) and another dicarboxylic acid adapted to the formation of highly polymeric linear polyesters. These modified highly polymeric linear polyesters can also be prepared by condensing a mixture of TMCD and another bifunctional glycol with one or more of the defined bifunctional hexacarbocyclic dicarboxylic acids. Other combinations which can be condensed are apparent. The modified linear polyesters of this more particular embodiment having the highest melting points are preferably prepared by condensing at least 50 mole percent of TMCD (50–100%) and up to 50 mole percent of another bifunctional glycol (0–50%), with a bifunctional dicarboxylic composition wherein at least 50 mole percent thereof is a hexacarbocyclic dicarboxylic compound (50–100%) and up to 50 mole percent thereof is another bifunctional dicarboxylic compound (0–50%). Of course, smaller proportion of TMCD or hexacarbocyclic dicarboxylic compound can be employed. Obviously, the polymers of this invention will be derived from a substantial proportion of TMCD so as to produce a polymer having characteristics definitely reflecting the improvements contributed by the presence of TMCD.

Accordingly, as a higher melting embodiment of this invention there is provided a highly polymeric linear polyester containing recurring units of the type just described hereinabove as (1) which also contains up to 50 mole percent of recurring units described in (2) hereinabove having the following formula:

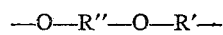

wherein R' has been previously defined and R'' represents an organic radical containing from 2 to 20 carbon atoms which is the dehydroxylated residue derived from a bifunctional glycol.

Other embodiments of this invention will also be apparent to those skilled in the art.

The bifunctional dicarboxylic acids and related compounds which can be advantageously employed include, in addition to the free acids, the various alkyl, aryl or other esters thereof, acid halides thereof and anhydrides thereof. Most advantageously the aryl diesters (phenyl, tolyl or xylyl) are generally employed.

The TMCD employed can be used in the form of either of its isomers or a mixture thereof.

The TMCD or any of the other glycols can be employed as esters thereof (such as esters of a lower alkanoic acid). However, it is generally advantageous to employ the free glycol.

The condensation reaction can be advantageously facilitated by the employment of a catalyst. The best catalyst for each reaction is determined by the nature of the reactants. Generally, when an alkyl or preferably an aryl diester of the acidic compound is being employed, an ester interchange type of catalyst is to be preferred. It is an unobvious aspect of this invention that the aryl diesters must generally be used to obtain a polymer having an inherent viscosity about 0.5 employing the usually advantageous ester exchange polymerization process. Numerous patents have, issued in the last few years describing numerous advantageous catalysts which can be employed. Various techniques as to the use of the catalysts are well known in the art. For example, if the free acid is being reacted with the free glycol, a catalyst is generally not added until after the preliminary condensation has gotten underway.

The reaction is generally begun employing equivalent proportions of the reactants using an aryl diester of the acidic compound and the dihydroxy compound. The reaction initially involves heating to a temperature sufficient to cause a preliminary condensation followed by the evaporation of volatile byproducts. The entire reaction is preferably conducted with agitation under an inert atmosphere. The temperature can then be advantageously increased with or without the immediate application of a vacuum. As the temperature is further increased, the pressure can be advantageously greatly reduced and the condensation allowed to proceed until the desired degree of polymerization is achieved. The product can be considered finished at this stage or it can be subjected to further polymerization in the solid phase in accordance with well-known techniques. Thus, the highly polymeric condensation product produced as just described can be cooled, pulverized, and the powder heated to a temperature somewhat less than that employed during the last stage of the molten phase polymerization thereby avoiding coagulation of the solid particles. The solid phase polymerization is advantageously conducted until the desired degree of polymerization is achieved. The solid phase polymerization, among other things, results in a higher degree of polymerization without the accompanying degradation which frequently takes place when continuing the last stage of the melt phase polymerization at a temperature high enough to achieve the desired degree of polymerization. The solid phase process is advantageously conducted with agitation employing an inert atmosphere at either normal atmospheric pressure or under a greatly reduced pressure.

Examples of hexacarbocyclic dicarboxylic acids wherein the carboxy radicals are attached to a hexacarbocyclic nucleus in para relationship include terephthalic acid, trans-hexahydroterephthalic acid, p,p'-sulfonyldibenzoic acid, 4,4'-diphenic acid, 4,4'-benzophenonedicarboxylic acid, 1,2-di(p-carboxyphenyl)ethane, 1,2-di(p-carboxyphenoxy)-ethane, 4,4'-dicarboxydiphenyl ether, etc. All of these acids contain at least one hexacorbocyclic nucleus. Fused rings can also be present such as in 1,4- or 1,5-naphthalenedicarboxylic acid. The hexacarbocyclic dicarboxylic acids are preferably those containing a trans-cyclohexane nucleus or an aromatic nucleus containing from one to two benzene rings of which at least one has the usual benzenoid unsaturation. Of course, either fused or attached rings can be present. All of the compounds named in this paragraph come within the scope of this preferred group.

Examples of other bifunctional dicarboxylic organic acids which are adapted to the formation of linear polyesters and which can be employed in accordance with this invention as described above include oxalic acid, carbonic acid, succinic acid, adipic acid, sebacic acid, azelaic acid, α-ethylsuberic acid, α,α-diethyladipic acid, dimethylmalonic acid, dicarboxy diethyl ether, isophthalic acid, orthophthalic acid, hexahydro-orthophthalic acid, etc. Carbonic acid is an obvious equivalent included among these other acids.

In addition to mixtures of dicarboxylic organic acids, the polyesters defined in this invention can also be modified by the employment of aminocarboxylic acids or hydroxycarboxylic or other related acids such as hydroxypivalic acid; hydroxybutyric acid, hydroxy caproic acid, p-hydroxybenzoic acid, 6-aminohexanoic acid, p-aminobenzoic acid, p-aminocarbanilic acid, p-hydroxycarbanilic acid, etc. Moreover, aminoalcohols can also be used such as 6-aminohexanol; likewise aminophenols such as 4-aminophenol or p-hydroxyaniline can be employed. The use of diisocyanates is described in another application as mentioned above. The bifunctional reactants contemplated by this paragraph may contain from 2 to 40 carbon atoms and be aliphatic or aromatic.

Examples of modifying glycols which can be employed in accordance with this invention include the polymethylene glycols containing from 2 to 10 or more carbon atoms such as ethylene glycol, 1,5-pentanediol, 1,10-decanediol, and other glycols of this series as well as the ether glycols such as diethylene glycol, triethylene glycol, etc. Branched chained aliphatic glycols which can be employed include 2,2-dimethyl-1,3-propanediol, 2-methyl-1,5-pentanediol, etc. Carbocyclic glycols can also be employed such as 1,4-di(hydroxyethyl)benzene or 1,4-cyclohexanedimethanol (cis or trans isomers or mixtures thereof). Other glycols which can be employed include various derivatives of those already mentioned which contain nitrogenous substituents or numerous other substituents which do not interfere with the formation of a highly polymeric linear polyester. In addition to various glycols as modifying dihydroxy compounds the aromatic dihydric phenols can be employed, e.g., hydroquinone, bisphenol A, 4,4'-bisphenol and other bisphenols such as described by Schnell in Agnew. Chem. 68, 633 et seq. (1956), etc. Those familiar with the art will be aware of the effect of various substituents on melting points and other properties of the polyesters produced. It is well known that there is quite a variety of dihydroxy compounds available for the preparation of linear polyesters.

The polyesters of this invention which contain a mixture of dicarboxylic organic acids have unexpectedly high melting points for modified polyesters of this character and in addition have improved dyeing qualities whereby fibers can be prepared which can be woven into fabrics which dye to keep shades without the use of a carrier as is generally employed with polyethylene terephthalate dyeing procedures.

The linear polyester compositions of this invention are generally characterized by superior weathering properties and resistance to moisture whereby the products having from the higher down to the relatively low melting points are markedly more efficacious than the products produced from glycols other than TMCD.

The methods of forming the polyesters of this invention into fibers and films are well known in the art and need no elaboration herein; in brief, the polyesters of this invention can be heated and melt extruded followed by quenching, drawing, and heat setting employing techniques that are described in the prior art.

As is apparent from the above description of this invention there are various combinations of glycols and dicarboxylic acids which can be condensed, that is:

(A) TMCD (1,3-trans or 1,3-cis or mixtures thereof).

(B) Dihydroxy compounds, e.g., glycols, bisphenols, hydroquinone, etc.

(C) Hexacarbocyclic para-linked dicarboxylic organic acids (e.g., terephthalic, trans-hexahydroterephthalic, p,p′-sulfonyldibenzoic, etc.).

(D) Bifunctional dicarboxylic organic acids (in lieu of or in addition to those of C).

The especially advantageous polyesters of this invention are derived from a glycol constituent which includes at least about 50 mole percent of A although as little as about 10 mole percent can also be employed. These polyesters melt at temperatures up to about 375° C. and can be used as molding compositions or extruded into fibers, films, and other shaped objects.

A particularly advantageous class of these polyesters is derived from A condensed with C. These polyesters generally melt at temperatures of from about 250° to about 375° C. and can be formed into especially valuable oriented fibers or films.

Another particularly valuable class of these polyesters is derived from A condensed with C wherein a portion of either or both of A or C is replaced with B or D, respectively. By keeping the mole percentage of the total replacement to less than 50% of A or less than 50% of C or by keeping the sum of both replacements to a sum which is less than 50%, the modified polyesters so produced have melting points generally above 200° C. (often above 250° C.) and can be formed into quite valuable oriented fibers or films having modified characteristics such as improved elasticity, dye receptivity, reduced tendency toward static electrification, better adaptability for compression molding or extrusion, etc.

POLYESTER-AMIDES

The above detailed description of the use of 2,2,4,4-tetraalkyl-1,3-cyclobutanediols as a reactant in the preparation of polyesters can also be applied to the preparation of polyester-amides as is apparent to persons having ordinary skill in this art. However, there are distinct differences in properties created by the modifying effects of the amide linkages in the polymer molecules. Obviously, the polyester-amides are to be preferred when such modified properties are sought as in instances where higher moisture absorption, dyeability, etc., are desired. However, in many applications the presence of amide linkages is to be avoided as in attaining some electrical properties, stability toward certain reagents, and various other chemical and physical properties. Such variations in properties are also effected by the presence of blocks of polyester or polyamide linkages in the polymer molecules. These block polymers are less similar to polyesters than are the polyester-amides having somewhat random distribution of ester and amide links. In general, the use of TMCD produces its especially advantageous effects in polyesters. However, polyester-amides of exceptionally valuable properties can also be produced. Although there are quite distinct differences in the properties, the processes for preparing polyester-amides are generally quite similar to those for preparing polyesters. Thus, the bifunctional diamines can be employed in conjunction with the TMCD and this combination can then be condensed with a bifunctional dicarboxylic acid. Moreover, other modifications include the employment of bifunctional aminoalcohols, hydroxycarboxylic acids (already referred to above), and aminocarboxylic acids.

Examples of reactants which can be employed include hexamethylenediamine, ethylenediamine, 3-amino-2,2-dimethylpropanol, other aliphatic diamines, aromatic diamines such as benzidine and p-xylylene-α,α′-diamine, hydroxyethylamine, hydroxyoctamethylene-amine, other aliphatic and aromatic hydroxyamines such as p-xylylene - α - hydroxyl - α′-amine, p-aminomethylbenzoic acid, 6-amino-caproic acid, and other aliphatic and aromatic aminocarboxylic acids, various hydroxycarboxylic acids as described hereinbefore, various dicarboxylic acids as also described hereinabove, and other known compounds of these types. Generally, these bifunctional reactants contain from 1 to 20 carbon atoms and advantageously are analogous in basic molecular structure to the dicarboxylic acids and glycols illustrated above.

These various reactants can be employed in various proportions and in various combinations (mixtures) as is apparent to those persons having ordinary skill in this art. Such persons are also acquainted with the processes, techniques and other factors involved in preparing such polyester-amides including various modifications such as is illustrated by U.S. Patent 2,547,113 and other similar prior art.

Thus, according to a particular embodiment of this invention there is provided a highly polymeric, linear polyester-amide having a molecular structure which contains a substantial proportion of recurring units having the following formula:

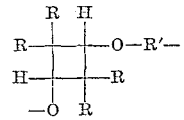

wherein the cylobutane ring is selected from the group consisting of the cis and trans isomers thereof and R′ represents an organic radical containing from 1 to 20 carbon atoms which is derived from a bifunctional carboxy compound, and (2) recurring units having the following formula:

—R⁴—R′— wherein R′ has been defined above and R⁴ represents an organic radical containing from 2 to 20 carbon atoms which is derived from a bifunctional amine.

In the various formulas throughout this specification it is apparent that various symbols used are such that

represents a hexacarbocyclic dicarboxylic acid wherein the carboxy radicals are attached to a hexacarbocyclic nucleus in a para relationship; HO—R′—OH represents a bifunctional carboxy compound; HO—R″—OH represents a bifunctional glycol; HO—R‴—OH represents a bifunctional dicarboxylic acid; and R⁴H₂ represents a bifunctional amine. The term bifunctional is well known in the art as illustrated by Carothers' patents such as U.S. 2,071,251, dated Feb. 16, 1937.

This invention can be further illustrated by the following examples of preferred embodiments although it will be understood that these examples are included merely for purposes of illustration and are not intended to limit the scope of the invention unless otherwise specifically indicated:

*Example 1*

A mixture of 14.3 g. (0.1 mole) of 2,2,4,4-tetramethyl-cyclobutane-1,3-diol (approximately a 1:1 mixture of cis- and trans-isomers) and 32.4 g. (0.1 mole) of diphenyl trans-cyclohexane-1,4-dicarboxylate was placed in a reaction vessel equipped with a stirrer, a short distillation column, and an inlet for dry, purified nitrogen. A suspension of 0.001 g. of lithium hydride in 0.2 ml. toluene, and 0.002 g. of calcium hydride was added as catalyst. A nitrogen atmosphere was maintained over the reaction mixture. The reactants were melted and heated to 250° C. The melt was stirred at 250° C. for 30 minutes. Phenol was distilled from the reaction mixture as it formed. A vacuum of 30–60 mm. was applied to further remove the phenol. Finally the temperature was increased to 270° and the pressure reduced to 0.5 mm. After 20 minutes of stirring under these conditions, the melt viscosity of the polyester was quite high. The vacuum was bled to nitrogen and the polymer removed from the flask. It was light amber in color and was soluble in methylene dichloride. A clear, flexible film was cast from the methylene dichloride dope.

The inherent viscosity of the polymer, as measured in a solvent mixture of 60 parts phenol and 40 parts tetrachloroethane, was 0.45. The melting point, as determined under crossed nicols on the hot stage of a microscope, was 178–210° C. The polymer has excellent hydrolytic stability and is useful in the production of photographic film and as a molding plastic.

*Example 2*

The pure cis-isomer of 2,2,4,4-tetramethylcyclobutane-1,3-diol was used in Example 1 in place of the mixed cis- and trans-isomers. The melting range of the resulting polymer was essentially unchanged, 170–210° C.

*Example 3*

A polymer was prepared from diphenyl isophthalate and 2,2,4,4-tetramethylcyclobutane-1,3-diol by the procedure described in Example 1. It had an inherent viscosity of 0.42 and a melting range of 166–215° C. It was also soluble in methylene dichloride.

*Example 4*

A mixture of 14.4 g. (0.1 mole) of 2,2,4,4-tetramethylcyclobutane-1,3-diol and 31.8 g. (0.1 mole) of diphenyl terephthalate was placed in a reaction vessel equipped with a stirrer, a short distillation column, and an inlet for dry, purified nitrogen. A suspension of 0.03 g. of lithium hydride in 0.5 ml. toluene and 0.01 g. magnesium powder was added as catalyst. A nitrogen atmosphere was maintained over the reaction mixture. The reactants were melted at 200° C. and heating was continued at 200° C. until the reaction had subsided, as evidenced by the cessation of rather vigorous bubbling. The pressure was reduced so that phenol was slowly removed by distillation. As the melt viscosity increased, the pressure was reduced further. The pressure was finally reduced to a value of 0.5 mm. The reaction mixture solidified in a short time. Heating was continued at 200° C. under vacuum for 5–10 minutes to remove as much phenol as possible. The prepolymer was cooled under vacuum and ground to a particle size of 0.01 inch or less. The prepolymer in the powdered form was further built up by heating the powder at 180–270° C. and holding at 270° C. for one hour under a vacuum of 0.2 mm.

The inherent viscosity of the polymer, as measured in a solvent mixture of 60 parts phenol and 40 parts tetrachloroethane, was 0.8. The melting point, as determined under crossed nicols on the hot stage of a microscope, was 270–320° C.

The polymer was soluble in tetrachloroethane and in methylene chloride containing 10% trifluoroacetic acid. A film was cast from the latter solvent mixture. This film was clear and colorless. It had the following properties:

Tensile strength (p.s.i.)=6900
Elongation (%)=9.5
Tensile modulus (p.s.i.)=2.28×10⁵
Heat distortion*=185° C.

* 2% extension under load of 50 p.s.i.

Oxidative and hydrolytic stability of the film were very good. There was no decrease in inherent viscosity of the film after 15 hours in air at 200° C. The film was still colorless. There was only a 15% decrease in inherent viscosity after 8 days at 110° C. and 100% relative humidity. The polycarbonate of 2,2-bis(4-hydroxyphenyl)propane (bisphenol A polycarbonate) had a 30% decrease in inherent viscosity under the same conditions of hydrolysis.

*Example 5*

A polymer was prepared by reacting diphenyl terephthalate with 2,2,4,4-tetraethylcyclobutane-1,3-diol according to the procedure used in Example 1. It melted over the range 206–233° C. It can be used in lacquers and can be melt extruded to form films and plastics.

*Example 6*

A polymer was prepared from 2,2,4,4-tetramethylcyclobutane-1,3-diol and diphenyl carbonate by the procedure described in Example 4. The diol was a mixture of 52% trans- and 48% cis-isomers. Lithium hydride was used as the catalyst in an amount equal to 0.05% by weight of the reactants. The prepolymer was prepared at the same temperature (200° C.) and solid-phase buildup was carried out at 270° C. under vacuum for 1½ hours.

The inherent viscosity of the polymer was 0.89. (An inherent viscosity of 0.59 was obtained when the solid-phase buildup was carried out at 250° C. for 1½ hours.) The polycarbonate had a melting point of 275–287° C. It was soluble in methylene chloride and a clear, tough film could be cast from the dope. This polymer is useful in the manufacture of film base, protective coating, packaging film, molded objects, fibers, etc.

*Example 7*

A polymer was prepared from a 2:1 molar ratio of dibutyl carbonate and 2,2,4,4-tetramethylcyclobutane-1,3-diol (58% trans- and 42% cis-isomers). Sodium butoxide was used as the catalyst in a concentration of 0.005% by weight of sodium based on the polymer formed. After distillation of the butyl alcohol formed by ester interchange, the reaction mixture was heated to 220° C. in an atmosphere of nitrogen and low vacuum was applied. Polymer buildup occurred by elimination of butyl carbonate between chains. The pressure was slowly reduced to about 0.5 mm. After 30–45 minutes, the prepolymer turned solid. It was cooled under vacuum, ground to a powder and built up solid phase as in Example 6.

The inherent viscosity of the polymer was 0.71. It had a melting point of 280–293° C. This polycarbonate was soluble in methylene chloride and a clear, colorless film was cast from this solvent. The film had the following properties:

Tensile strength (p.s.i.)=6100
Elongation (%)=2.5
Tensile modulus (p.s.i.)=3.1×10⁵
Heat distortions*=227° C.

* 2% extension under load of 50 p.s.i.

Oxidative and hydrolytic stability of the film were very good. There was only a 9% decrease in inherent viscosity of the film after 15 hours in air at 200° C. There was no loss in viscosity after exposure to 100% relative humidity at 110° C. for eight days.

*Example 8*

A polymer was prepared from diphenyl terephthalate and the pure cis-isomer of 2,2,4,4-tetramethylcyclobutane-1,3-diol by the method outlined in Example 4. The catalyst in this run was lithium dispersed in petroleum at a concentration of 0.04% by weight of lithium based on the polymer formed. The prepolymer was prepared at 240° C. and solid-phased buildup was carried out at 260° C. for two hours under a vacuum of 0.1 mm.

The inherent viscosity of the polymer, as measured in a solvent mixture of 60 parts phenol and 40 parts tetrachloroethane, was 0.76. The melting point, as determined under crossed nicols on the hot stage of microscope, was 296–308° C.

A film was cast from a solvent mixture of 95 parts by volume of methylene chloride and 5 parts trifluoroacetic acid. The film was clear and colorless. It had the following properties:

Tensile strength (p.s.i.)=6200
Elongation (%)=4.2
Tensile modulus (p.s.i.)=2.24×10⁵
Heat distortion*=212° C.

* 2% extension under load of 50 p.s.i.

*Example 9*

A polymer was prepared from diphenyl terephthalate and the pure trans-isomer of 2,2,4,4-tetramethylcyclobutane-1,3-diol by the procedure described in Example 8. The inherent viscosity of the polymer was 0.55. It did not melt below 350° C. The trans-diol terephthalate polymer was not soluble in boiling tetrachloroethane. The cis- diol terephthalate polymer was soluble in methylene chloride.

*Example 10*

A copolymer having the composition: 80 mole percent terephthalic, 20 mole percent carbonic, and 100 mole percent 2,2,4,4 - tetramethylcyclobutane - 1,3 - diol (42% cis-, 58% trans-isomers) was prepared. This polymer had an inherent viscosity of 1.31 and a melting point of 280–288° C. The physical properties of a cast film were:

Tensile strength (p.s.i.)=6800
Elongation (%)=15.7
Tensile modulus=2.44×10⁵ p.s.i.
Heat distortion=194° C.

*Example 11*

A copolymer having the composition: 80 mole percent terephthalic, 20 mole percent azelaic, and 100 mole percent 2,2,4,4-tetramethylcyclobutane-1,3-diol (42% cis-, 58% trans-isomers) was prepared. This polymer had an inherent viscosity of 1.26 and a melting point of 250–262° C. The physical properties of a cast film were:

Tensile strength (p.s.i.)=6700
Elongation (%)=7.1
Tensile modulus (p.s.i.)=2.28×10⁵
Heat distortion=122° C.

Injection molding of the copolymer gave tough, flexible test specimens with the following properties:

Durometer hardness=78
Button impact strength=25.6
Tensile strength (p.s.i.)=4570
Elongation (%)=16
Tensile modulus (p.s.i.)=1.61×10⁵

*Example 12*

A copolymer having the composition: 80 mole percent terephthalic, 20 mole percent isophthalic, and 100 mole percent 2,2,4,4 - tetramethylcyclobutane - 1,3 - diol (42% cis-, 58% trans-isomers) was prepared. This polymer had an inherent viscosity of 0.94 and a melting range of 280–326° C. It started softening at 190° C.

*Example 13*

A copolymer having the composition: 100 mole percent terephthalic, 50 mole percent 1,4-cyclohexanedimethanol (70% trans-, 30% cis-isomers) and 50 mole percent 2,2,4,4-tetramethylcyclobutane-1,3-diol (42% cis-, 58% trans-isomers) was prepared according to the procedure described in Example 8. Equimolar amounts of diphenyl terephthalate and the two diols were used. This copolymer had an inherent viscosity of 0.80 and a melting range of 200–238° C. It started softening at 130° C.

The copolymers described in Examples 10–13 are especially valuable in producing molded objects which are tough and flexible. They are also very resistant to oxidative and hydrolytic degradation.

*Example 14*

A mixture of 0.2 g. mole of dimethyl terephthalate, 0.1 g. mole of 79% aqueous hexamethylene diamine, 0.4 g. mole of TMCD and 25 ml. of butanol was placed in a 500 ml. three-necked flask fitted with a stirrer, thermometer and reflux condenser. The mixture was heated with a metal bath maintained at about 100° C. for several days to complete the ammonolysis reaction. The reflux condenser was replaced with a distilling head and 0.4 g. mole dimethyl terephthalate and 0.6 g. mole of TMCD added. The temperature was increased toward 200° C. and 10 ml. of 14.4% titanium tetrabutoxide in butanol added. The polyesterification was carried out in the usual manner by heating at gradually increasing temperatures and then applying a vacuum so as to produce a prepolymer having an inherent viscosity of about 0.2. The prepolymer was cooled and converted to a powder which was polymerized in the solid phase using techniques as described above so as to obtain a polyester-amide having an inherent viscosity of about 0.9. This polyester-amide was melt spun in conventional equipment to give a fiber which could be cold drawn. The polyester-amide can also be produced as a film by extrusion or by dope casting or other techniques.

Other polyester-amides were prepared employing different reactants in a manner analogous to the various examples of polyesters presented hereinabove whereby products were produced having variations in properties similar to those resulting from varying the reactants employed in producing the analogous polyesters. For example, a polyester-amide was produced by inter-reacting 0.6 mole of diethyl isophthalate, 0.1 mole of benzidine and 1.0 mole of 2,2,4,4-tetraalkyl-1,3-cyclobutanediols according to the procedure of Example 14.

The following copolymers were prepared using bisphenols and aryl diesters of the terephthalic acid according to the procedures described in the preceding examples:

*Example 15*

A copolymer having the composition: 100 mole percent terephthalic, 50 mole percent 2,2,4,4-tetramethylcyclobutane-1,3-diol (52% cis-, 48% trans-isomers), and 50 mole percent 4,4'-isopropylidenediphenol (bisphenol A) was prepared. This polymer had an inherent viscosity of 0.78 and a softening range of 320–335° C. It was soluble in methylene chloride and a clear, tough film could be cast from the dope.

*Example 16*

A copolymer having the composition: 100 mole percent terephthalic, 75 mole percent 2,2,4,4-tetramethylcyclobutane-1,3-diol (52% cis-, 48% trans-isomers), and 25 mole percent 4,4'-isopropylidenediphenol (bisphenol A) was prepared. This polymer had an inherent viscosity of 0.80 and a softening range of 320–343° C. It was soluble in methylene chloride and gave a smooth, clear, colorless dope. It makes an excellent protective coating being very resistant to oxidative and hydrolytic degradation.

As shown by Example 3 above, the sole use of a hexacarbocyclic dicarboxylic acid which contains no para linked carboxy radicals, e.g., isophthalic acid, produces valuable polymers which may melt at below 200° C. but have many useful applications as molding materials, film, coatings, insulators, dielectrics, packaging materials, etc. Thus, a valuable group of polyesters are broadly defined above include those wherein (A) is at least 50 mole percent of a hexacarbocyclic meta-linked dicarboxylic organic acid, said polyester melting at above about 150° C.

Polyesters derived from TMCD can be modified with "blocks" of polyamides to further improve the dye adsorption properties, e.g., low molecular weight block polyamides can be prepared by the methods given in U.S. Patents 2,547,113 and 2,691,006. Polyamides useful in these processes can be prepared from any aliphatic or aromatic dicarboxylic acid and an aliphatic diamine. Also one can prepare a "block" polyamide by using aminoacids such as 6-aminohexanoic acid, 7-aminoheptonic acid, 2-methyl-6-aminohexanoic acid, etc. These block polyamides can be terminated in carboxyl groups, ester groups, or hydroxyl groups. These "blocks" can then be incorporated in the lower molecular weight polyesters by the usual procedures. The preferred compositions generally contain 10–25% by weight of the block polymer. The melting points of such compositions are generally between 250–300° C.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A linear high molecular weight resinous condensation polymer of (A) at least one bifunctional carboxylic acid and (B) at least one bifunctional compound selected from the group consisting of (a) 2,2,4,4-tetraalkyl-1,3-cyclobutanediols and (b) a mixture composed of 2,2,4,4-tetraalkyl-1,3-cyclobutanediols and up to 50 mole percent of said mixture of a compound selected from the group consisting of a different bifunctional dihydroxy compound, a bifunctional amino-alcohol, and a bifunctional aliphatic diamine, said 2,2,4,4-tetraalkyl-1,3-cyclobutanediols being selected from the group consisting of the cis- and trans-isomers thereof and wherein each alkyl group contains from 1 to 4 carbon atoms, the relative proportions of (A) and (B) constituents being such as to constitute a polymer selected from the group consisting of polyesters and polyesteramides.

2. A polymer as defined by claim 1 which is a polyesteramide.

3. A polyesteramide as defined by claim 2 wherein (A) is terephthalic acid.

4. A polyesteramide as defined by claim 3 wherein (B) is a mixture of 2,2,4,4-tetramethyl-1,3-cyclobutanediol and 1,6-hexamethylenediamine.

5. A polyesteramide as defined by claim 2 wherein (A) is trans-1,4-cyclohexanedicarboxylic acid and (B) is a mixture of 2,2,4,4-tetramethyl-1,3-cyclobutanediol and 1,6-hexamethylenediamine.

6. A polymer as defined by claim 1 which is a polyester.

7. A polyester as defined by claim 6 wherein (A) is at least 50 mole percent of a hexacarbocyclic dicarboxylic acid wherein the carboxy radicals are attached to a hexacarbocyclic nucleus in a para relationship, which polymer melts at above 200° C.

8. A polyester as defined by claim 7 wherein said hexacarbocyclic acid is terephthalic acid.

9. A polyester as defined by claim 8 wherein (A) is terephthalic acid and (B) is 2,2,4,4-tetramethyl-1,3-cyclobutanediol.

10. A polyester as defined by claim 8 wherein (A) is terephthalic acid and (B) is a mixture of 2,2,4,4-tetramethyl-1,3-cyclobutanediol and 1,4-cyclohexanedimethanol.

11. A polyester as defined by claim 7 wherein (A) is a mixture of said hexacarbocyclic acid and an aliphatic bifunctional carboxylic acid.

12. A polyester as defined by claim 11 wherein (A) is a mixture of terephthalic acid and carbonic acid and (B) is 2,2,4,4-tetramethyl-1,3-cyclobutanediol.

13. A polyester as defined by claim 11 wherein (A) is a mixture of terephthalic acid and azelaic acid and (B) is 2,2,4,4-tetramethyl-1,3-cyclobutanediol.

14. A polyester as defined by claim 7 wherein (A) is at least 50 mole percent trans-1,4-cyclohexanedicarboxylic acid.

15. A polyester as defined by claim 14 wherein (A) is a mixture of trans-1,4-cyclohexanedicarboxylic acid and terephthalic acid and (B) is 2,2,4,4-tetramethyl-1,3-cyclobutanediol.

16. A polyester as defined by claim 7 wherein (A) is a mixture of terephthalic acid and isophthalic acid and (B) is 2,2,4,4-tetramethyl-1,3-cyclobutanediol.

17. A polyester as defined by claim 6 wherein (A) is from 50 to 100 mole percent of an aliphatic bifunctional carboxylic acid and the 2,2,4,4-tetramethyl-1,3-cyclobutanediol constituent is from 50 to 100% trans isomer.

18. A polyester as defined by claim 17 wherein (A) is 50 to 100 mole percent carbonic acid.

19. A polyester as defined by claim 8 wherein (A) is terephthalic acid and (B) is a mixture of 2,2,4,4-tetramethyl-1,3-cyclobutanediol and 4,4'-isopropylidene diphenol.

20. A polyester as defined by claim 6 wherein (A) is at least 50 mole percent of a hexacarbocyclic dicarboxylic acid wherein the carboxy radicals are attached to a hexacarbocyclic nucleus in a meta relationship, which polyester melts at above 100° C.

21. A polyester as defined by claim 20 wherein (A) is isophthalic acid.

22. A fiber of a polymer as defined by claim 1.
23. A fiber of a polymer as defined by claim 6.
24. A fiber of a polymer as defined by claim 7.
25. A fiber of a polymer as defined by claim 8.
26. A fiber of a polymer as defined by claim 9.
27. A fiber of a polymer as defined by claim 10.

28. A high molecular weight resinous polycarbonate of carbonic acid and 2,2,4,4-tetramethylcyclobutanediol-1,3.

29. A high molecular weight resinous mixed polyester-polycarbonate of carbonic acid, a dicarboxylic acid and 2,2,4,4-tetramethylcyclobutanediol-1,3.

30. A fiber of the polymer as defined by claim 28.
31. A film of the polymer as defined by claim 28.
32. A film of a polymer as defined by claim 1.
33. A film of a polymer as defined by claim 6.
34. A film of a polymer as defined by claim 7.
35. A film of a polymer as defined by claim 8.
36. A film of a polymer as defined by claim 9.
37. A film of a polymer as defined by claim 10.

References Cited by the Examiner

UNITED STATES PATENTS

| 2,071,250 | 2/1937 | Carothers | 260—75 |
| 2,720,507 | 10/1955 | Caldwell | 260—75 |
| 2,764,575 | 9/1956 | Kohler et al. | 260—75 |
| 2,828,338 | 3/1958 | Lavigne | 260—75 XR |
| 2,901,466 | 8/1959 | Kibler et al. | 260—75 |
| 2,926,145 | 2/1960 | McConnell et al. | 260—2 |
| 2,936,324 | 5/1960 | Hasek et al. | 260—617 |

OTHER REFERENCES

Title page and pp. 10–12 of Ph.D. Thesis of L. L. Miller.

"Structure of Some Derivatives of Dimethyl Ketene," Cornell University, 1937.

SAMUEL H. BLECH, *Primary Examiner.*

WILLIAM H. SHORT, *Examiner.*

L. P. QUAST, M. STERMAN, *Assistant Examiners.*